(12) United States Patent
Sechrist et al.

(10) Patent No.: US 8,921,627 B2
(45) Date of Patent: *Dec. 30, 2014

(54) PRODUCTION OF DIESEL FUEL FROM BIORENEWABLE FEEDSTOCKS USING NON-FLASHING QUENCH LIQUID

(75) Inventors: Paul A. Sechrist, Des Plaines, IL (US); Robert L. Bunting, Jr., Des Plaines, IL (US); Nicholas W. Bridge, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 270 days.

This patent is subject to a terminal disclaimer.

(21) Appl. No.: 12/333,379

(22) Filed: Dec. 12, 2008

(65) Prior Publication Data

US 2010/0137662 A1 Jun. 3, 2010

(51) Int. Cl.
  *C10G 3/00* (2006.01)
  *C10G 45/02* (2006.01)
  *C10G 65/12* (2006.01)

(52) U.S. Cl.
  CPC .. *C10G 3/60* (2013.01); *C10G 3/46* (2013.01); *C10G 3/50* (2013.01); *C10G 45/02* (2013.01); *C10G 65/12* (2013.01); *C10G 2400/04* (2013.01); *C10G 2300/1037* (2013.01); *C10G 2300/1014* (2013.01); *C10G 2300/1018* (2013.01); *C10G 2300/1022* (2013.01); *C10G 2300/4081* (2013.01); *C10G 2400/02* (2013.01); *C10G 2400/08* (2013.01)
  USPC .............................. 585/240; 585/242; 585/241

(58) Field of Classification Search
  None
  See application file for complete search history.

(56) References Cited

U.S. PATENT DOCUMENTS

| | | | |
|---|---|---|---|
| 4,300,009 A | 11/1981 | Haag et al. | 585/408 |
| 4,310,440 A | 1/1982 | Wilson et al. | 252/435 |
| 4,440,871 A | 4/1984 | Lok et al. | 502/214 |
| 4,758,419 A | 7/1988 | Lok et al. | 423/306 |
| 4,793,984 A | 12/1988 | Lok et al. | 423/306 |
| 4,795,623 A | 1/1989 | Evans | 423/328 |
| 4,924,027 A | 5/1990 | Kulprathipanja et al. | 562/580 |
| 4,943,424 A | 7/1990 | Miller | 423/328 |
| 4,948,568 A | 8/1990 | Chessmore et al. | 422/140 |
| 4,992,605 A | 2/1991 | Craig et al. | 585/240 |
| 5,082,956 A | 1/1992 | Monnier et al. | 549/507 |
| 5,087,347 A | 2/1992 | Miller | 208/46 |

(Continued)

FOREIGN PATENT DOCUMENTS

| | | |
|---|---|---|
| CN | 11270300 A | 9/2008 |
| CN | 11343552 A | 1/2009 |

(Continued)

OTHER PUBLICATIONS

Gong, et al. "Numerical simulation of gas-liquid two-phase flow with reverse buoyancy in quench chamber . . . " Journal of Chemical Industry . . . , vol. 54 n 7 Jul. 2003 pp. 930-935.

Hong et al. "Bet practice for the distribution and metering of two-phase steam", Proceedings—SPE Annual Western Regional Mtg. Anchorage, AK 1996, pp. 25-36.

(Continued)

*Primary Examiner* — Tam M Nguyen
(74) *Attorney, Agent, or Firm* — Mark R Willis

(57) ABSTRACT

A process has been developed for producing diesel boiling range fuel from renewable feedstocks such as plant oils and animal oils, fats, and greases. The process involves treating a renewable feedstock by hydrogenating and deoxygenating to provide a hydrocarbon fraction useful as a diesel or aviation boiling range fuel or fuel blending component. If desired, the hydrocarbon fraction can be isomerized to improve cold flow properties. A portion of the hydrogenated and deoxygenated feedstock is used as a non-flashing liquid quench stream to control the temperature of the hydrogenation and deoxygenation reactor.

13 Claims, 5 Drawing Sheets

(56) References Cited

U.S. PATENT DOCUMENTS

| | | | |
|---|---|---|---|
| 5,158,665 A | 10/1992 | Miller | 208/46 |
| 5,186,722 A | 2/1993 | Cantrell et al. | |
| 5,208,005 A | 5/1993 | Miller | 423/702 |
| 5,246,566 A | 9/1993 | Miller | 208/27 |
| 5,444,032 A | 8/1995 | Perego et al. | 502/235 |
| 5,510,306 A | 4/1996 | Murray | 502/64 |
| 5,608,968 A | 3/1997 | Maus et al. | 29/890 |
| 5,705,722 A | 1/1998 | Monnier et al. | |
| 5,716,897 A | 2/1998 | Galperin et al. | 502/333 |
| 5,741,759 A | 4/1998 | Gee et al. | 507/103 |
| 5,851,949 A | 12/1998 | Galperin et al. | 502/333 |
| 5,908,134 A | 6/1999 | Hale et al. | 220/582 |
| 5,981,419 A | 11/1999 | Carati et al. | 502/66 |
| 6,214,943 B1 | 4/2001 | Newton et al. | 526/68 |
| 6,337,059 B1 | 1/2002 | Schubert et al. | 423/210 |
| 6,626,424 B2 | 9/2003 | Ngan et al. | 261/112.1 |
| 6,984,365 B2 | 1/2006 | Nelson et al. | 422/224 |
| 7,074,371 B2 | 7/2006 | McDougald et al. | 422/191 |
| 7,074,372 B2 | 7/2006 | Muldowney et al. | 422/194 |
| 7,112,312 B2 | 9/2006 | Chou | 422/220 |
| 7,115,670 B2 | 10/2006 | Hensman et al. | 518/712 |
| 7,225,670 B2 | 6/2007 | Tsukada et al. | |
| 7,232,935 B2 | 6/2007 | Jakkula et al. | |
| 7,279,018 B2 | 10/2007 | Jakkula et al. | |
| 7,332,131 B2 | 2/2008 | Chen et al. | 422/140 |
| 7,425,657 B1 | 9/2008 | Elliott et al. | |
| 7,459,597 B2 | 12/2008 | Koivusalmi et al. | |
| 7,491,858 B2 | 2/2009 | Murzin et al. | |
| 7,501,546 B2 | 3/2009 | Koivusalmi et al. | |
| 7,540,952 B2 | 6/2009 | Pinho et al. | |
| 2004/0230085 A1 | 11/2004 | Jakkula et al. | 585/240 |
| 2006/0186020 A1 | 8/2006 | Gomes | |
| 2006/0207166 A1 | 9/2006 | Herskowitz et al. | |
| 2007/0006523 A1 | 1/2007 | Myllyoja et al. | |
| 2007/0010682 A1 | 1/2007 | Myllyoja et al. | |
| 2007/0068848 A1 | 3/2007 | Monnier et al. | |
| 2007/0131579 A1 | 6/2007 | Koivusalmi et al. | |
| 2007/0135316 A1 | 6/2007 | Koivusalmi et al. | |
| 2007/0135663 A1 | 6/2007 | Aalto et al. | |
| 2007/0161832 A1 | 7/2007 | Myllyoja et al. | |
| 2007/0164459 A1 | 7/2007 | Gottlieb et al. | 261/78.2 |
| 2007/0170091 A1 | 7/2007 | Monnier et al. | |
| 2007/0175795 A1 | 8/2007 | Yao et al. | |
| 2007/0260102 A1 | 11/2007 | Duarte Santiago et al. | |
| 2007/0281875 A1 | 12/2007 | Scheibel et al. | |
| 2007/0287873 A1 | 12/2007 | Coupard et al. | |
| 2007/0299291 A1 | 12/2007 | Koivusalmi | |
| 2008/0025903 A1 | 1/2008 | Cortright | |
| 2008/0033188 A1 | 2/2008 | Dumesic et al. | |
| 2008/0045731 A1 | 2/2008 | Zhang | |
| 2008/0050792 A1 | 2/2008 | Zmierczak et al. | |
| 2008/0052983 A1 | 3/2008 | Aulich et al. | |
| 2008/0066374 A1 | 3/2008 | Herskowitz | |
| 2008/0092436 A1 | 4/2008 | Seames et al. | |
| 2008/0132435 A1 | 6/2008 | Ferreira Fontes et al. | |
| 2008/0156694 A1 | 7/2008 | Chapus et al. | |
| 2008/0161614 A1 | 7/2008 | Bertoncini et al. | |
| 2008/0161615 A1 | 7/2008 | Chapus et al. | |
| 2008/0163543 A1 | 7/2008 | Abhari et al. | |
| 2008/0173570 A1 | 7/2008 | Marchand et al. | |
| 2008/0216391 A1 | 9/2008 | Cortright et al. | |
| 2008/0229654 A1 | 9/2008 | Bradin | |
| 2008/0244962 A1 | 10/2008 | Abhari et al. | |
| 2008/0281134 A1 | 11/2008 | Ghonasgi et al. | |
| 2008/0300434 A1 | 12/2008 | Cortright et al. | |
| 2008/0300435 A1 | 12/2008 | Cortright et al. | |
| 2008/0302001 A1 | 12/2008 | Koivusalmi et al. | |
| 2008/0308457 A1 | 12/2008 | Dindi et al. | |
| 2008/0308458 A1 | 12/2008 | Dindi et al. | |
| 2008/0312480 A1 | 12/2008 | Dindi et al. | |
| 2008/0313955 A1 | 12/2008 | Silva et al. | |
| 2009/0014354 A1 | 1/2009 | Knuuttila et al. | |
| 2009/0019763 A1 | 1/2009 | Ghonasgi et al. | |
| 2009/0029427 A1 | 1/2009 | Miller | |
| 2009/0031617 A1 | 2/2009 | O'Rear | |
| 2009/0062578 A1 | 3/2009 | Koivusalmi et al. | |
| 2009/0069610 A1 | 3/2009 | Roberts, IV et al. | |
| 2009/0071872 A1 | 3/2009 | Ginosar et al. | |
| 2009/0077866 A1 | 3/2009 | Kalnes et al. | |
| 2009/0082606 A1 | 3/2009 | Marker et al. | |
| 2009/0084026 A1 | 4/2009 | Miller | |
| 2009/0088351 A1 | 4/2009 | Miller | |
| 2009/0107033 A1 | 4/2009 | Gudde et al. | |
| 2009/0124839 A1 | 5/2009 | Dumesic et al. | |
| 2009/0126260 A1 | 5/2009 | Aravanis et al. | |

FOREIGN PATENT DOCUMENTS

| | | |
|---|---|---|
| EP | 1719811 A1 | 8/2006 |
| EP | 2046917 | 1/2008 |
| WO | WO 2007/064019 A1 | 6/2007 |
| WO | WO 2007063874 A1 | 6/2007 |
| WO | WO 2007064015 A1 | 6/2007 |
| WO | WO 2007/125332 A1 | 11/2007 |
| WO | WO 2007/141293 A1 | 12/2007 |
| WO | WO 2008/012415 A2 | 1/2008 |
| WO | WO 2008/020048 A2 | 2/2008 |
| WO | WO 2008/053284 A1 | 5/2008 |
| WO | WO 2008/101945 A1 | 8/2008 |
| WO | WO 2008/105518 A1 | 9/2008 |
| WO | WO 2008/119895 A2 | 9/2008 |
| WO | WO 2008/141830 A1 | 11/2008 |
| WO | WO 2008/141831 A1 | 11/2008 |
| WO | WO 2008/151792 A1 | 12/2008 |
| WO | WO 2008/152199 A1 | 12/2008 |
| WO | WO 2009/004181 A2 | 1/2009 |
| WO | WO 2009/011639 A2 | 1/2009 |
| WO | WO 2009/013233 A2 | 1/2009 |
| WO | WO 2009/020055 A1 | 2/2009 |
| WO | WO 2009/025542 A1 | 2/2009 |
| WO | WO 2009/059819 A1 | 5/2009 |
| WO | WO 2009/059920 A2 | 5/2009 |

OTHER PUBLICATIONS

Ming et al. "Numerical research on coupled solid-liquid heat transfer and two . . . ", Journal of Basic Science and Engineering, vol. 14 n 3, Sep. 2006, pp. 309-315.

Li, et al. "Distortion Minimization During Gas Quenching Process" Journal of Materials Processing Technology, vol. 172 (2006) pp. 249-257.

Maiti, et al. "Gas—Liquid Distributors for Trickle-Bed . . . ", Ind. Eng. Chem. Res. 2007, vol. 46, pp. 6164-6182.

Li et al. "Multidisciplinary Optimization of Gas-Quenching Process", Journal of Materials Engineering and Performance (2005) vol. 14, pp. 136-143.

U.S. Appl. No. 11/770,826, filed Jun. 29, 2007, Mark Van Wees et al.
U.S. Appl. No. 12/193,176, filed Aug. 18, 2008, Tom N. Kalnes et al.
U.S. Appl. No. 12/193,196, filed Aug. 18, 2008, John P. Brady et al.

S. J. Miller, New Molecular Sieve Process for Lube Dewaxing by Wax Isomerization, *Microporous Materials* 2 (1994) 439-449.

V. Calemma et al., Hydroisomerization and Hydrocracking of Long Chain n-alkanes on Pt/amorphous $SiO_2$-$Al_2O_3$ Catalyst, *Applied Catalysis A: General*, 190 (2000), 207-218.

Z. Li et al., Multidisciplinary Optimization of Gas-Quenching Process, *Journal of Materials Engineering and Performance*, vol. 14(1), Feb. 2005, 136-143.

K.C. Hong et al., Best Practice for the Distribution and Metering of Two-Phase Steam, *Proceedings—SPE Annual Western Regional Meeting*, (1996), 25-36.

Z. Li et al., Distortion Minimization During Gas Quenching Process, *Journal of Materials Processing Technology*, 172 (2006), 249-257.

R.N. Maiti et al., Gas-Liquid Distributors for Trickle-Bed Reactors : A Review, *Ind. Eng. Chem. Res.*, 2007, 46, 6164-6182.

X. Gong et al., Numerical Simulation of Gas-Liquid Two-Phase Flow with Reverse Buoyancy in Quench Chamber of Coal Gasifier and its Application, *Journal of Chemical Industry and Engineering (China)*, Jul. 2003, vol. 54, No. 7, 930-935.

P. Ming et al., Numerical Research on Coupled Solid-liquid Heat Transfer and Two-phase Flow During Quenching Process, *Journal of Basic Science and Engineering*, Sep. 2006, vol. 14, No. 3, 309-315.

PRODUCTION OF DIESEL FUEL FROM BIORENEWABLE FEEDSTOCKS USING NON-FLASHING QUENCH LIQUID

FIELD OF THE INVENTION

This invention relates to a process for producing diesel boiling range hydrocarbons useful as transportation fuel from renewable feedstocks such as the triglycerides and free fatty acids found in materials such as plant oils, and animal oils, fats and greases. The process involves hydrogenation, decarboxylation, decarbonylation, and/or hydrodeoxygenation and isomerization in one or more reactors. A non-flashing liquid quench stream is introduced counter current to the flow in the deoxygenation zone to control the temperature in the reactor beds.

BACKGROUND OF THE INVENTION

As the demand for diesel boiling range fuel increases worldwide there is increasing interest in sources other than petroleum crude oil for producing diesel fuel and diesel fuel blending components. One such renewable source is what has been termed biorenewable sources. These renewable sources include, but are not limited to, plant oils such as corn, rapeseed, canola, soybean and algal oils, animal fats such as inedible tallow, fish oils and various waste streams such as yellow and brown greases and sewage sludge. The common feature of these sources is that they are composed of glycerides and Free Fatty Acids (FFA). Both of these classes of compounds contain n-aliphatic carbon chains having from about 8 to about 24 carbon atoms. The aliphatic carbon chains in the glycerides or FFAs can be fully saturated or mono, di- or poly-unsaturated.

There are reports in the art disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as paraxylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

Disclosed herein is a process which comprises one or more steps to hydrogenate, deoxygenate and isomerize the renewable feedstock. The temperature in the hydrogenation and deoxygenation zones is controlled using a non-flashing liquid quench which is introduced counter current to the flow of reactants and products in the hydrogenation and deoxygenation zone.

SUMMARY OF THE INVENTION

A hydroconversion process for producing an isoparaffin-rich diesel boiling range, aviation boiling range, or fuel blending product from a renewable feedstock wherein the process comprises treating the renewable feedstock in a reaction zone by hydrogenating and deoxygenating the feedstock at reaction conditions to provide a first reaction zone product comprising paraffins, carbon dioxide, and water. The carbon dioxide and water generated as byproducts in the first reaction zone are separated and removed from the first reaction product. At least a portion of the remaining first reaction zone product is recycled to the reaction zone as a non-flashing liquid quench. The liquid quench is introduced to the reaction zone counter current to the flow of reactants and products in the reaction zone. At least a portion of the remaining first reaction zone product is introduced to a hydroisomerization reaction zone. At least the isomerized product is recovered.

BRIEF DESCRIPTION OF THE DRAWINGS

FIG. 1 shows the location of the quench system in an overall fuel production process.

DETAILED DESCRIPTION OF THE INVENTION

Figure 1:
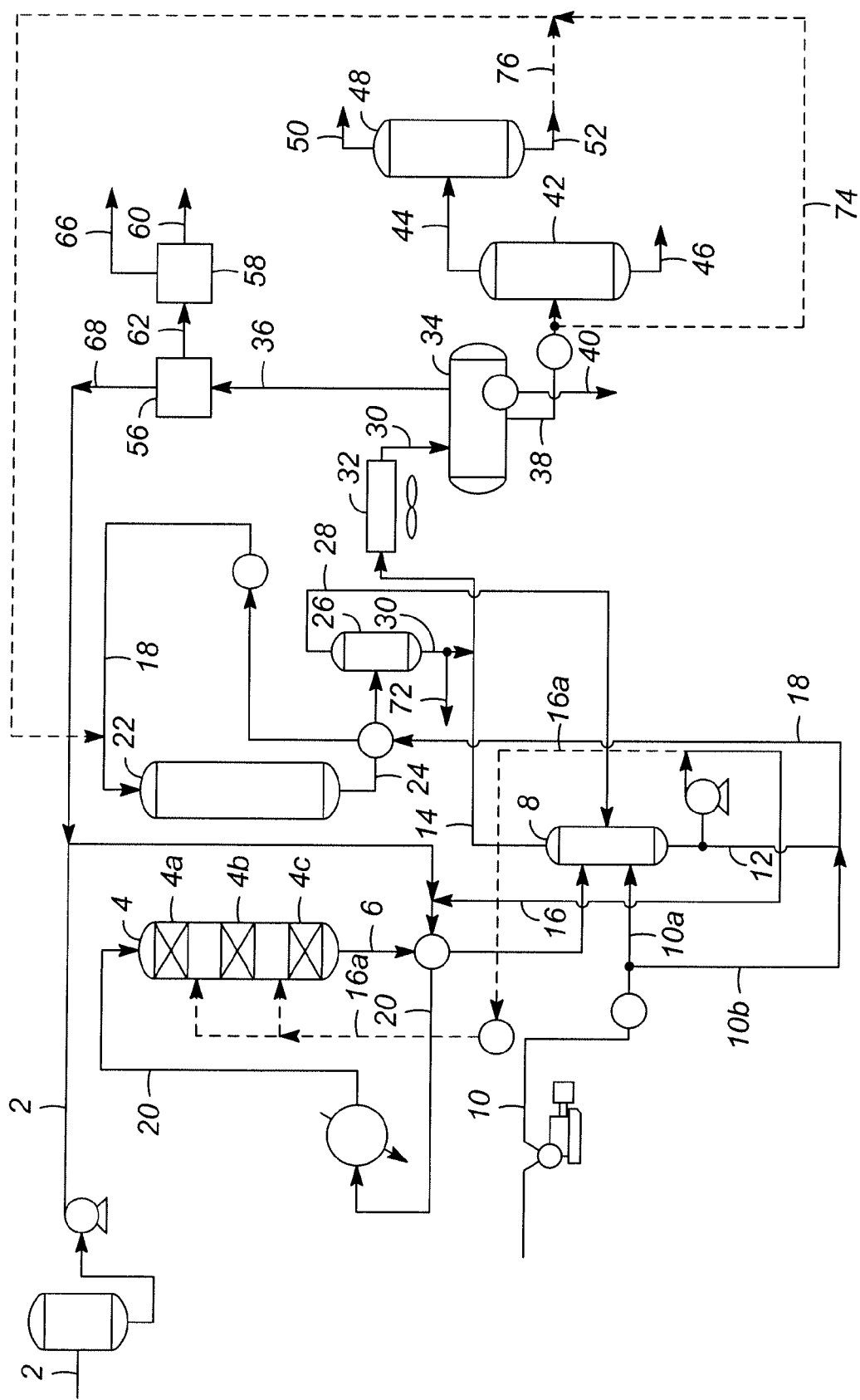
FIG. 1 is a schematic of one embodiment of the invention.

As stated, the present invention relates to a process for producing a hydrocarbon stream useful as diesel boiling range fuel, an aviation boiling range fuel, or a fuel blending component from renewable feedstocks such as renewable feedstocks originating from plants or animals. Some of these feedstocks are known as biorenewable fats and oils. The term renewable feedstock is meant to include feedstocks other than those obtained from petroleum crude oil. The biorenewable feedstocks that can be used in the present invention include any of those which comprise glycerides and free fatty acids (FFA). Most of the glycerides will be triglycerides, but monoglycerides and diglycerides may be present and processed as well. Examples of these feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, jatropha oil, tallow, yellow and brown greases, lard, train oil, fats in milk, fish oil, algal oil, sewage sludge, and the like. Additional examples of renewable feedstocks include non-edible vegetable oils from the group comprising Jatropha curcas (Ratanjoy, Wild Castor, Jangli Erandi), Madhuca indica (Mohuwa), Pongamia pinnata (Karanji Honge), and Azadiracta indicia (Neem). The triglycerides and FFAs of the typical vegetable or animal fat contain aliphatic hydrocarbon chains in their structure which have about 8 to about 24 carbon atoms, with a majority of the fats and oils containing high concentrations of fatty acids with 16 and 18 carbon atoms Mixtures or co-feeds of renewable feedstocks and petroleum derived hydrocarbons may also be used as the feedstock. Other feedstock components which may be used, especially as a co-feed component in combination with the above listed feedstocks, include spent motor oils and industrial lubricants, used paraffin waxes, liquids derived from the gasification of coal, biomass, or natural gas followed by a downstream liquefaction step such as Fischer-Tropsch technology, liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. In some applications, an advantage of using a co-feed component is the transformation of what may have been considered to be a waste product from a petroleum based or other process into a valuable co-feed component to the current process.

Renewable feedstocks that can be used in the present invention may contain a variety of impurities. For example, tall oil is a byproduct of the wood processing industry and tall oil contains esters and rosin acids in addition to FFAs. Rosin acids are cyclic carboxylic acids. The renewable feedstocks may also contain contaminants such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow.

Another possible means for removing contaminants is a mild acid wash. This is carried out by contacting the feedstock with an acid such as sulfuric, nitric or hydrochloric acid in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds which are well known in the art. These can include alumina guard beds either with or without demetallation catalysts such as nickel or cobalt. Filtration and solvent extraction techniques are other choices which may be employed. Hydroprocessing such as that described in U.S. Ser. No. 11/770,826, hereby incorporated by reference, is another pretreatment technique which may be employed.

The renewable feedstock is flowed to a first reaction zone comprising two or more catalyst beds in one or more reactors. The reaction zone also includes one or more quench zones. The term "feedstock" is meant to include feedstocks that have not been treated to remove contaminants as well as those feedstocks purified in a pretreatment zone. In the first reaction zone, the renewable feedstock is contacted with a hydrogenation or hydrotreating catalyst in the presence of hydrogen at hydrogenation conditions to hydrogenate the reactive components such as olefinic or unsaturated portions of the n-paraffinic chains. Hydrogenation and hydrotreating catalysts are any of those well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina or activated carbon. Hydrogenation conditions include a temperature of about 40° C. to about 400° C. and a pressure of about 689 kPa absolute (100 psia) to about 13,790 kPa absolute (2000 psia). In another embodiment the hydrogenation conditions include a temperature of about 200° C. to about 300° C. and a pressure of about 1379 kPa absolute (200 psia) to about 4826 kPa absolute (700 psia). Other operating conditions for the hydrogenation zone are well known in the art.

The catalysts enumerated above are also capable of catalyzing decarboxylation, decarbonylation and/or hydrodeoxygenation of the feedstock to remove oxygen. Decarboxylation, decarbonylation, and hydrodeoxygenation are herein collectively referred to as deoxygenation reactions. Decarboxylation conditions include a relatively low pressure of about 689 kPa (100 psia) to about 6895 kPa (1000 psia), a temperature of about 200° C. to about 400° C. and a liquid hourly space velocity of about 0.5 to about 10 hr$^{-1}$. In another embodiment the decarboxylation conditions include the same relatively low pressure of about 689 kPa (100 psia) to about 6895 kPa (1000 psia), a temperature of about 288° C. to about 345° C. and a liquid hourly space velocity of about 1 to about 4 hr$^{-1}$. Since hydrogenation is an exothermic reaction, as the feedstock flows through the catalyst bed the temperature increases and decarboxylation and hydrodeoxygenation will begin to occur. Thus, it is envisioned and is within the scope of this invention that all the reactions occur simultaneously in the reactor beds. Alternatively, the conditions can be controlled such that hydrogenation primarily occurs in one bed and decarboxylation and/or hydrodeoxygenation occurs in a second bed. Finally, desired hydrogenation can be carried out in one reactor, while decarboxylation, decarbonylation, and/or hydrodeoxygenation can be carried out in a separate reactor.

The hydrogenation and deoxygenation reactions are typically highly exothermic reactions during which large amounts of heat are generated. The generated heat can substantially increase the temperature of the reaction mixture and the catalyst. The temperature of the first catalyst bed can be controlled by the temperature of the feedstock. However, the temperature in each succeeding bed, if uncontrolled, will be higher than the temperature in the preceding bed due to the heat generated by the exothermic reactions occurring in and the heat absorbed by the fluid streams. In order for the reactions in each bed to be conducted under proper intended conditions and to preserve the catalyst within each bed, the temperature of each succeeding bed is controlled by injecting a quench medium at or near the exit of the preceding bed. Quench gas is most often the cooling medium of choice, often the quench gas is hydrogen both because it is readily available and it serves to replenish hydrogen consumed by the hydrogenation reaction.

However, in the process herein, a readily available material which can be used as the quench fluid is a portion of the first reaction zone product stream. Unlike typical quench streams, the quench stream derived from the first reaction zone product stream is a liquid, non-flashing, quench stream. After removing gaseous material from the first reaction zone product stream, a portion of the liquid stream is recycled to the first reaction zone as described in detail below. Portions of the recycle stream may be used as the liquid quench stream injected between beds of the first reaction zone. The liquid quench stream may be injected in association with a quench zone containing standard quench equipment such as the quench delivery system, the spillway, the liquid fraction collection tray, the mixing chamber with outlet weir, perforated pre-distributor tray, and bubble cap, modified bubble cap or riser chimney tray.

Unlike applications employing a vapor quench, using the non-flashing liquid quench herein requires greater efforts to achieve proper mixing between the non-flashing liquid quench and the reactants and products in reaction zone and to achieve uniform distribution of the liquid quench across the reactor cross section. Without increased mixing and uniform distribution efforts, portions of the reactants and products of the reaction zone can bypass the liquid quench decreasing the effectiveness of the quench. For example, the temperature of the bed may not be uniformly controlled and hot spots may develop where fluid is able to bypass the quench medium.

To increase the mixing of the non-flashing liquid quench and the reaction mixture, the liquid quench is injected counter current to the flow of the reaction mixture. Spray nozzles as opposed to jets are a suitable device for providing an area containing spray droplets. The positioning of multiple spray nozzles is designed to provide uniform coverage of sprayed liquid quench over the cross sectional area of the reactor bed. Surprisingly, injecting the liquid non-flashing quench in a counter current mode enhances the mixing of the liquid quench and the reaction mixture, thereby increase the effectiveness of the quench cooling. The temperature of the quench liquid would be determined in conjunction with other process conditions such as the minimum temperature for cold flow properties. It is often desirable to provide the liquid quench at the coolest possible temperature. The amount of quench liquid needed is determined by analyzing the amount of material to be cooled, the temperature of the material to be cooled, and the temperature of the quench liquid.

The reaction product from the deoxygenation reactions will comprise both a liquid portion and a gaseous portion. The liquid portion comprises a hydrocarbon fraction which is essentially all n-paraffins and having a large concentration of paraffins in the range of about 9 to about 18 carbon atoms. The gaseous portion comprises hydrogen, carbon dioxide, carbon monoxide, water vapor, propane and perhaps sulfur components such as hydrogen sulfide or phosphorous component such as phosphine. The effluent from the deoxygenation reactor is conducted to a separation system such as a hot high pressure hydrogen stripper. One purpose of the hot high pressure hydrogen stripper is to selectively separate at least a portion of the gaseous portion of the effluent from the liquid portion of the effluent. As hydrogen is an expensive resource, to conserve costs, the separated hydrogen is recycled to the first reaction zone containing the deoxygenation reactor. Also, failure to remove the water, carbon monoxide, and carbon dioxide from the effluent may result in poor catalyst performance in the isomerization zone. Water, carbon monoxide, carbon dioxide, any ammonia or hydrogen sulfide are selectively stripped in the hot high pressure hydrogen stripper using hydrogen. The hydrogen used for the stripping may be dry, and free of carbon oxides. The temperature may be controlled in a limited range to achieve the desired separation and the pressure may be maintained at approximately the same pressure as the two reaction zones to minimize both investment and operating costs. The hot high pressure hydrogen stripper may be operated at conditions ranging from a pressure of about 689 kPa absolute (100 psia) to about 13,790 kPa absolute (2000 psia), and a temperature of about 40° C. to about 350° C. In another embodiment the hot high pressure hydrogen stripper may be operated at conditions ranging from a pressure of about 1379 kPa absolute (200 psia) to about 4826 kPa absolute (700 psia), or about 2413 kPa absolute (350 psia) to about 4882 kPa absolute (650 psia), and a temperature of about 50° C. to about 350° C. The hot high pressure hydrogen stripper may be operated at essentially the same pressure as the reaction zone. By "essentially", it is meant that the operating pressure of the hot high pressure hydrogen stripper is within about 1034 kPa absolute (150 psia) of the operating pressure of the reaction zone. For example, in one embodiment the hot high pressure hydrogen stripper separation zone is no more than 1034 kPa absolute (150 psia) less than that of the reaction zone.

The effluent enters the hot high pressure hydrogen stripper and at least a portion of the gaseous components, are carried with the hydrogen stripping gas and separated into an overhead stream. The remainder of the deoxygenation zone effluent stream is removed as hot high pressure hydrogen stripper bottoms and contains the liquid hydrocarbon fraction having components such as normal hydrocarbons having from about 8 to about 16 or 8 to about 24 carbon atoms. Other separation systems may be used, a hot high pressure hydrogen stripper is merely discussed as one example. Different feedstocks will result in different distributions of paraffins. A portion of this liquid hydrocarbon fraction in hot high pressure hydrogen stripper bottoms may be used as the liquid quench and the hydrocarbon recycle described below.

Hydrogen is a reactant in at least some of the reactions above, and a sufficient quantity of hydrogen must be in solution to most effectively take part in the catalytic reaction. Past processes have operated at high pressures in order to achieve a desired amount of hydrogen in solution and readily available for reaction. However, higher pressure operations are more costly to build and to operate as compared to their lower pressure counterparts. One advantage of the present invention is the operating pressure may be in the range of about 1379 kPa absolute (200 psia) to about 4826 kPa absolute (700 psia) which is lower than that found in other previous operations. In another embodiment the operating pressure is in the range of about 2413 kPa absolute (350 psia) to about 4481 kPa absolute (650 psia), and in yet another embodiment operating pressure is in the range of about 2758 kPa absolute (400 psia) to about 4137 kPa absolute (600 psia). Furthermore, the rate of reaction is increased resulting in a greater amount of throughput of material through the reactor in a given period of time. Hydrogen may be separated from process effluent(s) and recycled to the hydrogenation and deoxygenation zone, or the amount of hydrogen may be in only slight excess, about 5 to about 25%, of the hydrogen requirements of the hydrogenation and deoxygenation reactions and therefore not recycled. Another refinery unit, such as a hydrocracker, may be used as a source of hydrogen, which potentially eliminates the need for a recycle gas compressor.

In one embodiment, the desired amount of hydrogen is kept in solution at lower pressures by employing a large recycle of hydrocarbon to the deoxygenation reaction zone. Other processes have employed hydrocarbon recycle in order to control the temperature in the reaction zones since the reactions are exothermic reactions. However, the range of recycle to feedstock ratios used herein is determined not on temperature control requirements, but instead, based upon hydrogen solubility requirements. Hydrogen has a greater solubility in the hydrocarbon product than it does in the feedstock. By utilizing a large hydrocarbon recycle the solubility of hydrogen in the combined liquid phase in the reaction zone is greatly increased and higher pressures are not needed to increase the amount of hydrogen in solution. In one embodiment of the invention, the volume ratio of hydrocarbon recycle to feedstock is from about 2:1 to about 8:1 or 2:1 to about 6:1. In another embodiment the ratio is in the range of about 3:1 to about 6:1 and in yet another embodiment the ratio is in the range of about 4:1 to about 5:1.

Although the hydrocarbon fraction separated in the hot high pressure hydrogen stripper is useful as a diesel boiling range fuel, because it comprises essentially n-paraffins, it will have poor cold flow properties. If it is desired to improve the cold flow properties of the liquid hydrocarbon fraction, then the hydrocarbon fraction can be contacted with an isomerization catalyst under isomerization conditions to at least partially isomerize the n-paraffins to branched paraffins. The effluent of the second reaction zone, the isomerization zone, is a branched-paraffin-rich stream. By the term "rich" it is meant that the effluent stream has a greater concentration of branched paraffins than the stream entering the isomerization zone, and preferably comprises greater than 50 mass-% branched paraffins. It is envisioned that the isomerization zone effluent may contains 70, 80, or 90 mass-% branched paraffins. Isomerization can be carried out in a separate bed of the same reaction zone, i.e. same reactor, described above or the isomerization can be carried out in a separate reactor. For ease of description the following will address the embodiment where a second reactor is employed for the isomerization reaction. The hydrogen stripped product of the deoxygenation reaction zone is contacted with an isomerization catalyst in the presence of hydrogen at isomerization conditions to isomerize the normal paraffins to branched paraffins. Only minimal branching is required, enough to overcome the cold-flow problems of the normal paraffins. Since attempting for significant branching runs the risk of high degree of undesired cracking, the predominant isomerized product is a mono-branched hydrocarbon.

The isomerization of the paraffinic product can be accomplished in any manner known in the art or by using any suitable catalyst known in the art. One or more beds of catalyst may be used. It is preferred that the isomerization be operated in a co-current mode of operation. Fixed bed, trickle bed down flow or fixed bed liquid filled up-flow modes are both suitable. See also, for example, US 2004/0230085 A1 which is incorporated by reference in its entirety. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-1, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. Nos. 4,943,424; 5,087,347; 5,158,665; and 5,208,005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. Nos. 4,795,623 and 4,924,027. Further catalysts and conditions for skeletal isomerization are disclosed in U.S. Pat. Nos. 5,510,306, 5,082,956, and 5,741,759.

The isomerization catalyst may also comprise a modifier selected from the group consisting of lanthanum, cerium, praseodymium, neodymium, samarium, gadolinium, terbium, and mixtures thereof, as described in U.S. Pat. Nos. 5,716,897 and 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. Nos. 4,310,440; 4,440,871; 4,793,984; 4,758,419; 4,943,424; 5,087,347; 5,158,665; 5,208,005; 5,246,566; 5,716,897; and 5,851,949 are hereby incorporated by reference.

U.S. Pat. Nos. 5,444,032 and 5,608,968 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. An activated carbon catalyst support may also be used. U.S. Pat. Nos. 5,981,419 and 5,908,134 teach a suitable bifunctional catalyst which comprises: (a) a porous crystalline material isostructural with beta-zeolite selected from boro-silicate (BOR-B) and boro-alumino-silicate (Al-BOR-B) in which the molar $SiO_2$:$Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The isomerization catalyst may be any of those well known in the art such as those described and cited above. Isomerization conditions include a temperature of about 150° C. to about 360° C. and a pressure of about 1724 kPa absolute (250 psia) to about 4726 kPa absolute (700 psia). In another embodiment the isomerization conditions include a temperature of about 300° C. to about 360° C. and a pressure of about 3102 kPa absolute (450 psia) to about 3792 kPa absolute (550 psia). Other operating conditions for the isomerization zone are well known in the art. Operating at the low pressures allows for the optional introduction of hydrogen from another unit such as a hydrogen plant without the use of a make-up compressor which may be an option to reduce or eliminate hydrogen recycle. When hydrogen is not recycled, the amount of hydrogen introduced to the isomerization zone would be only slightly greater than that which is consumed, an excess of about 5 to about 25 percent of the consumption requirements.

The final effluent stream, i.e. the stream obtained after all reactions have been carried out, is now processed through one or more separation steps to obtain a purified hydrocarbon stream useful as a diesel fuel. With the final effluent stream comprising both a liquid component and a gaseous component, various portions of which are to be recycled, multiple separation steps may be employed. For example, hydrogen may be first separated in an isomerization effluent separator with the separated hydrogen being removed in an overhead stream. Suitable operating conditions of the isomerization effluent separator include, for example, a temperature of 230° C. and a pressure of 4100 kPa absolute (600 psia). If there is a low concentration of carbon oxides, or the carbon oxides are removed, the hydrogen may be recycled back to the hot high pressure hydrogen stripper for use both as a stripping gas and to combine with the remainder as a bottoms stream. The remainder is passed to the isomerization reaction zone and thus the hydrogen becomes a component of the isomerization reaction zone feed streams in order to provide the necessary hydrogen partial pressures for the reactor. The hydrogen is also a reactant in the deoxygenation reactors, and different feedstocks will consume different amounts of hydrogen. The isomerization effluent separator allows flexibility for the process to operate even when larger amounts of hydrogen are consumed in the first reaction zone. Furthermore, at least a portion of the remainder or bottoms stream of the isomerization effluent separator may be recycled to the isomerization reaction zone to increase the degree of isomerization.

The remainder of the final effluent after the removal of hydrogen still has liquid and gaseous components and is cooled, by techniques such as air cooling or water cooling and passed to a cold separator where the liquid component is separated from the gaseous component. Suitable operating conditions of the cold separator include, for example, a temperature of about 20 to 60° C. and a pressure of 3850 kPa absolute (560 psia). A water byproduct stream is also separated. At least a portion of the liquid component, after cooling and separating from the gaseous component, may be recycled back to the isomerization zone to increase the degree of isomerization. Prior to entering the cold separator, the remainder of the final effluent stream may be combined with the hot high pressure hydrogen stripper overhead stream, and the resulting combined stream may be introduced into the cold separator.

The liquid component contains the hydrocarbons useful as diesel fuel, termed diesel fuel range hydrocarbons, as well as smaller amounts of naphtha and LPG. The separated liquid component may be recovered as diesel fuel or it may be further purified in a product stripper which separates lower boiling components and dissolved gases into an LPG and naphtha stream from the diesel product containing $C_8$ to $C_{24}$ normal and branched alkanes. Suitable operating conditions of the product stripper include a temperature of from about 20 to about 200° C. at the overhead and a pressure from about 0 to about 1379 kPa absolute (0 to 200 psia).

The LPG and naphtha stream may be further separated in a debutanizer or depropanizer in order to separate the LPG into an overhead stream, leaving the naphtha in a bottoms stream. Suitable operating conditions of this unit include a temperature of from about 20 to about 200° C. at the overhead and a pressure from about 0 to about 2758 kPa absolute (0 to 400 psia). The LPG may be sold as valuable product or may be used in other processes such as a feed to a hydrogen production facility. Similarly, the naphtha may be used in other processes, such as the feed to a hydrogen production facility, a co-feed to a reforming process, or may be used as a fuel blending component in, for example, the gasoline blending pool.

The gaseous component separated in the product separator comprises mostly hydrogen and the carbon dioxide from the decarboxylation reaction. Other components such as carbon monoxide, propane, and hydrogen sulfide or other sulfur containing component may be present as well. It is desirable to recycle the hydrogen to the isomerization zone, but if the carbon dioxide was not removed, its concentration would quickly build up and effect the operation of the isomerization zone. The carbon dioxide can be removed from the hydrogen by means well known in the art such as reaction with a hot carbonate solution, pressure swing absorption, etc. Amine absorbers may be employed as taught in copending U.S. Ser. Nos. 12/193,176 and 12/193,196, hereby incorporated by reference. If desired, essentially pure carbon dioxide can be recovered by regenerating the spent absorption media.

Similarly, a sulfur containing component such as hydrogen sulfide may be present to maintain the sulfided state of the deoxygenation catalyst or to control the relative amounts of the decarboxylation reaction and the hydrogenation reaction that are both occurring in the deoxygenation zone. The amount of sulfur is generally controlled and so must be removed before the hydrogen is recycled. The sulfur components may be removed using techniques such as absorption with an amine or by caustic wash. Of course, depending upon the technique used, the carbon dioxide and sulfur containing components, and other components, may be removed in a single separation step such as a hydrogen selective membrane.

The hydrogen remaining after the removal of at least carbon dioxide may be recycled to the reaction zone where hydrogenation primarily occurs and/or to any subsequent beds or reactors. The recycle stream may be introduced to the inlet of the reaction zone and/or to any subsequent beds or reactors. One benefit of the hydrocarbon recycle is to control the temperature rise across the individual beds. However, as discussed above, the amount of hydrocarbon recycle may be determined based upon the desired hydrogen solubility in the reaction zone which is in excess of that used for temperature control. Increasing the hydrogen solubility in the reaction mixture allows for successful operation at lower pressures, and thus reduced cost.

The following embodiment is presented in illustration of this invention and is not intended as an undue limitation on the generally broad scope of the invention as set forth in the claims. First one embodiment of the process is described in general as with reference to FIG. 1. More detail as to specific embodiments of the process are shown in FIG. 2 through FIG. 5.

Turning to FIG. 1, the process begins with a renewable feedstock stream 2 which may pass through an optional feed surge drum. The feedstock stream is combined with recycle gas stream 68 and recycle stream 16 to form combined feed stream 20, which is heat exchanged with reactor effluent and then introduced into deoxygenation reactor 4. The heat exchange may occur before or after the recycle is combined with the feed. Deoxygenation reactor 4 may contain multiple beds shown in FIG. 2 as 4a, 4b and 4c. Deoxygenation reactor 4 contains at least one catalyst capable of catalyzing decarboxylation and/or hydrodeoxygenation of the feedstock to remove oxygen. Deoxygenation reactor effluent stream 6 containing the products of the decarboxylation and/or hydrodeoxygenation reactions is removed from deoxygenation reactor 4 and heat exchanged with stream 20 containing feed to the deoxygenation reactor. Stream 6 comprises a liquid component containing largely normal paraffin hydrocarbons in the diesel boiling range and a gaseous component containing largely hydrogen, vaporous water, carbon monoxide, carbon dioxide and propane.

Deoxygenation reactor effluent stream 6 is then directed to hot high pressure hydrogen stripper 8. Make up hydrogen in line 10 is divided into two portions, stream 10a and 10b. Make up hydrogen in stream 10a is also introduced to hot high pressure hydrogen stripper 8. In hot high pressure hydrogen stripper 8, the gaseous component of deoxygenation reactor effluent 6 is selectively stripped from the liquid component of deoxygenation reactor effluent 6 using make-up hydrogen 10a and recycle hydrogen 28. The dissolved gaseous component comprising hydrogen, vaporous water, carbon monoxide, carbon dioxide and at least a portion of the propane, is selectively separated into hot high pressure hydrogen stripper overhead stream 14. The remaining liquid component of deoxygenation reactor effluent 6 comprising primarily normal paraffins having a carbon number from about 8 to about 12 or about 8 to about 24 is removed as hot high pressure hydrogen stripper bottom 12.

Figure 2:
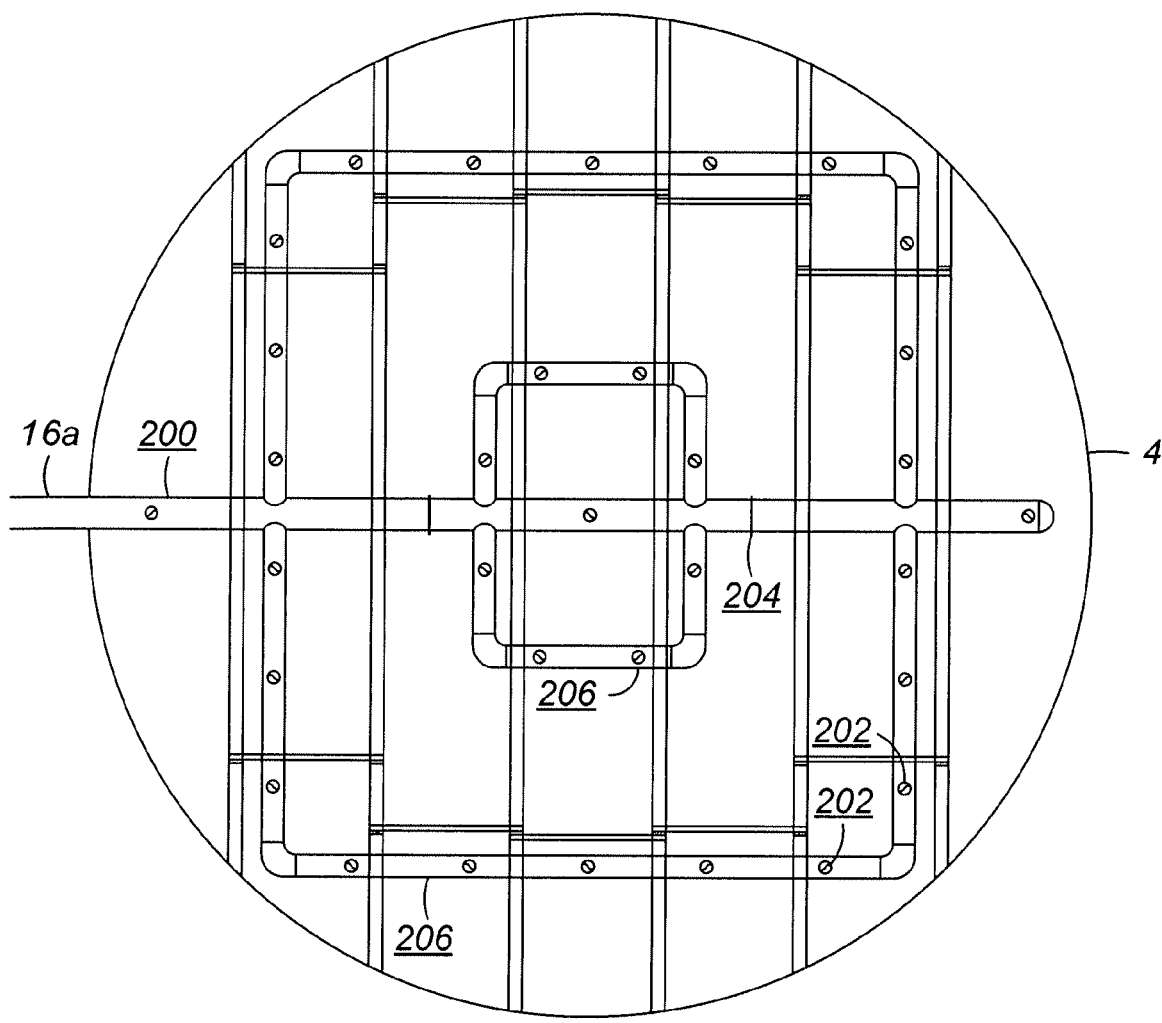
FIG. 2 is more detailed schematic of one embodiment the quench header, quench arms, and quench spray devices where the spray devices are arranged in a rectangular type pattern.
Figure 3:
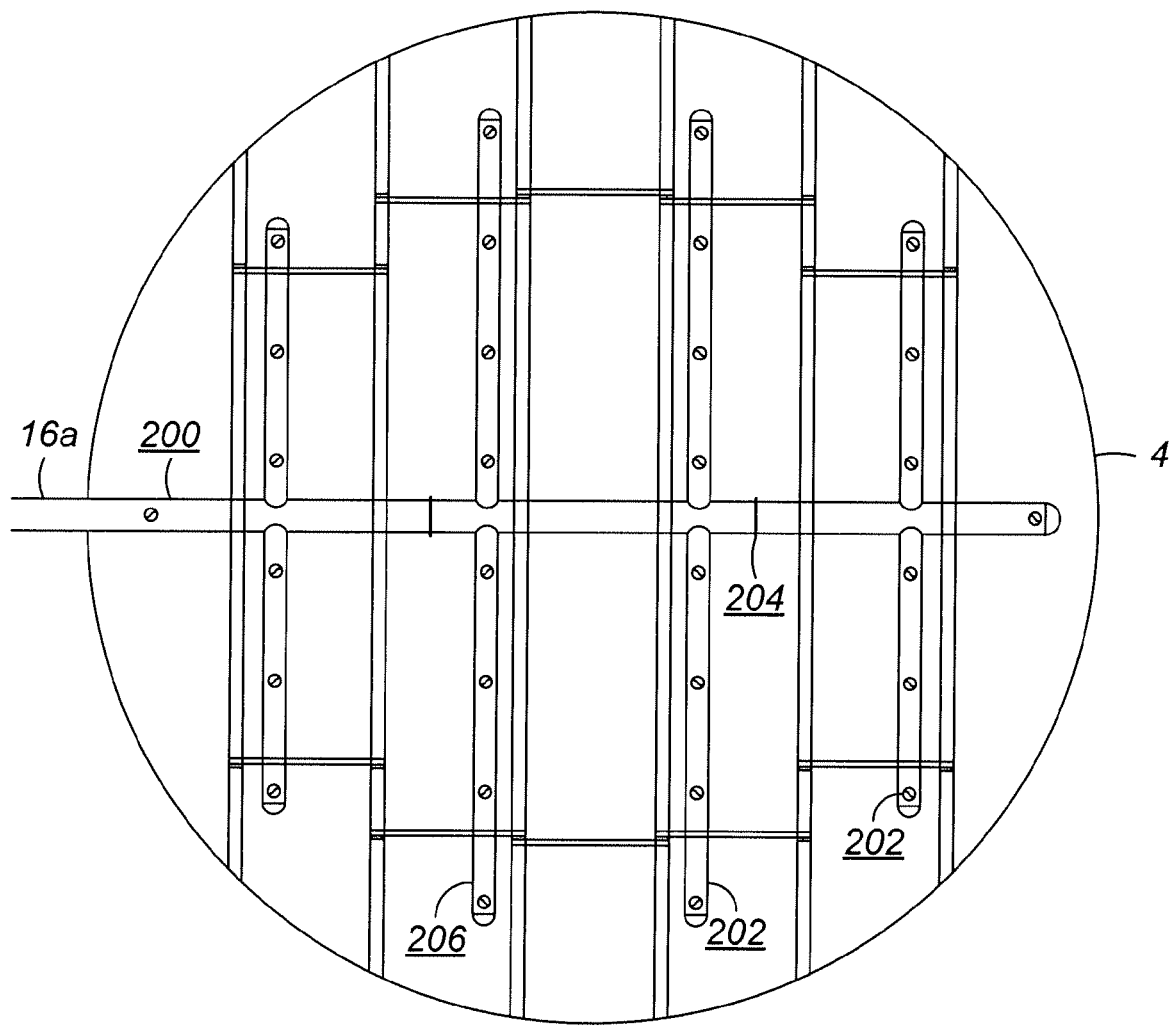
FIG. 3 is more detailed schematic of one embodiment the quench header, quench arms, and quench spray devices where the spray devices are arranged in a linear type pattern.
Figure 4:
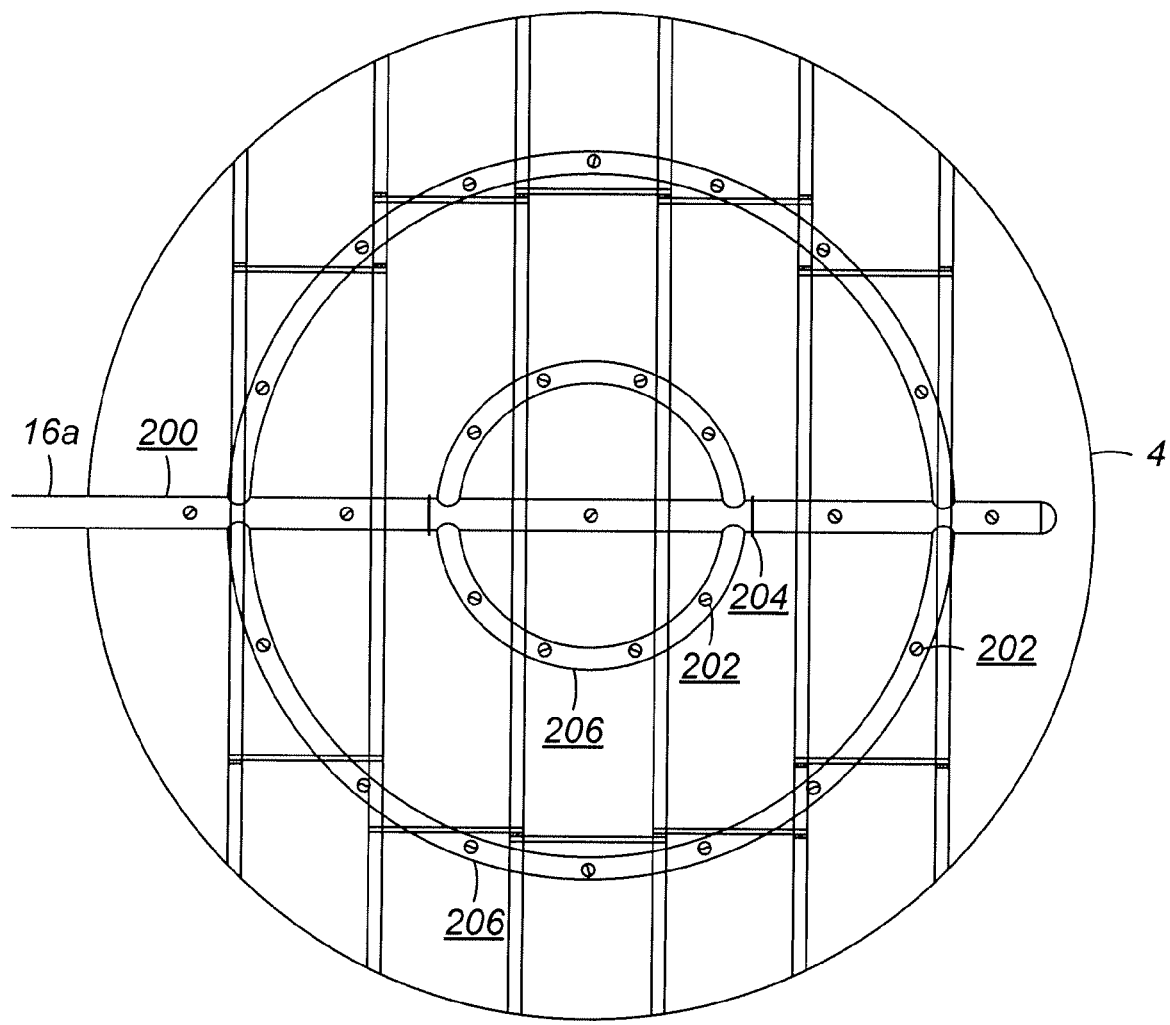
FIG. 4 is more detailed schematic of one embodiment the quench header, quench arms, and quench spray devices where the spray devices are arranged in a circular type pattern.
Figure 5:
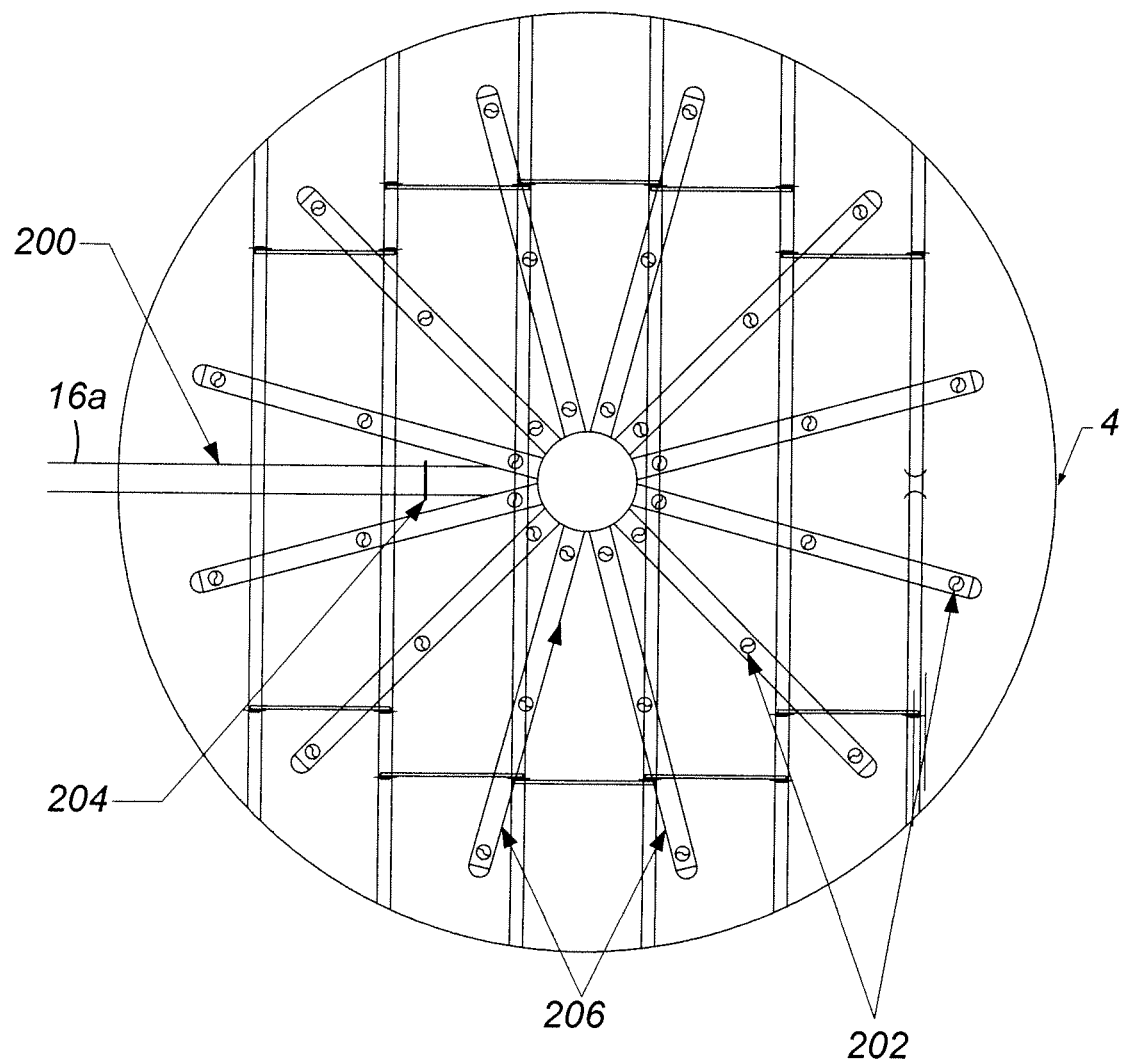
FIG. 5 is more detailed schematic of one embodiment the quench header, quench arms, and quench spray devices where the spray devices are arranged in a linear-radial type pattern.

A portion of hot high pressure hydrogen stripper bottoms forms recycle stream 16 and is combined with renewable feedstock stream 2 to create combined feed 20. Another portion of recycle stream 16, in stream 16a, is routed directly to deoxygenation reactor 4 and injected at interstage locations such as between beds 4a and 4b and between beds 4b and 4c as a quench liquid in order to provide temperature control. The injection of the quench fluid is countercurrent to the flow of reactants and products through the beds. FIG. 2 shows one embodiment of the quench liquid distribution system. A series of spray nozzles 202 are arranged at each quench elevation in the reactor. Low pressure spray nozzles 202 will be oriented so that they point countercurrent to the process flow allowing the maximum amount of contact time and mixing with the process fluid. As much as possible, the spray nozzles will be spaced so that there is slight overlap between the coverage of the spray between spray nozzles. Stream 16a delivers quench fluid to quench header 200 which is held in place within the reactor 4 by quench header pipe supports 204. Quench header is in fluid communication with quench arms 206 which are equipped with multiple quench spray devices such as spray nozzles 202. The pattern of the quench arms and the spray nozzles are selected so that the quench fluid is injected evenly and uniformly over the cross sectional area of reactor 4. The rectangular pattern shown in FIG. 2 is merely exemplary, other patterns and spray nozzle locations may be used. For example, one linear type pattern is shown in FIG. 3; a circular type pattern having concentric circles is shown in FIG. 4; and a linear-radial type of pattern is shown in FIG. 5. Other patterns may have square or other arrangements of the spray nozzles, while still having a light overlap of the spray regions.

Returning to FIG. 1, the remainder of hot high pressure hydrogen stripper bottoms in stream 12 is combined with hydrogen stream 10b to form combined stream 18 which is routed to isomerization reactor 22. Stream 18 may be heat exchanged with isomerization reactor effluent 24.

The product of the isomerization reactor containing a gaseous portion of hydrogen and propane and a branched-paraffin-rich liquid portion is removed in line 24, and after optional heat exchange with stream 18, is introduced into hydrogen separator 26. The overhead stream 28 from hydrogen separator 26 contains primarily hydrogen which may be recycled back to hot high pressure hydrogen stripper 8. Bottom stream 30 from hydrogen separator 26 is air cooled using air cooler 32 and introduced into product separator 34. In product separator 34 the gaseous portion of the stream comprising hydrogen, carbon monoxide, hydrogen sulfide, carbon dioxide and propane are removed in stream 36 while the liquid hydrocarbon portion of the stream is removed in stream 38. A water byproduct stream 40 may also be removed from product separator 34. Stream 38 is introduced to product stripper 42 where components having higher relative volatilities are separated into stream 44 with the remainder, the diesel range components, being withdrawn from product stripper 42 in line 46. Stream 44 is introduced into fractionator 48 which operates to separate LPG into overhead 50 leaving a naphtha bottoms 52. Any of optional lines 72, 74, or 76 may be used to recycle at least a portion of the isomerization zone effluent back to the isomerization zone to increase the amount of n-paraffins that are isomerized to branched paraffins.

The vapor stream 36 from product separator 34 contains the gaseous portion of the isomerization effluent which comprises at least hydrogen, carbon monoxide, hydrogen sulfide, carbon dioxide and propane and is directed to a system of amine absorbers to separate carbon dioxide and hydrogen sulfide from the vapor stream. Because of the cost of hydrogen, it is desirable to recycle the hydrogen to deoxygenation reactor 4, but it is not desirable to circulate the carbon dioxide or an excess of sulfur containing components. In order to separate sulfur containing components and carbon dioxide from the hydrogen, vapor stream 36 is passed through a system of at least two amine absorbers, also called scrubbers, starting with the first amine absorber zone 56. The amine chosen to be employed in first amine scrubber 56 is capable of selectively removing at least both the components of interest, carbon dioxide and the sulfur components such as hydrogen sulfide. Suitable amines are available from DOW and from BASF, and in one embodiment the amines are a promoted or activated methyldiethanolamine (MDEA). See U.S. Pat. No. 6,337,059, hereby incorporated by reference in its entirety. Suitable amines for the first amine absorber zone from DOW include the UCARSOL™ AP series solvents such as AP802, AP804, AP806, AP810 and AP814. The carbon dioxide and hydrogen sulfide are absorbed by the amine while the hydrogen passes through first amine scrubber zone and into line 68 to be recycled to the first reaction zone. The amine is regenerated and the carbon dioxide and hydrogen sulfide are released and removed in line 62. Within the first amine absorber zone, regenerated amine may be recycled for use again. The released carbon dioxide and hydrogen sulfide in line 62 are passed through second amine scrubber zone 58 which contains an amine selective to hydrogen sulfide, but not selective to carbon dioxide. Again, suitable amines are available from DOW and from BASF, and in one embodiment the amines are a promoted or activated MDEA. Suitable amines for the second amine absorber zone from DOW include the UCARSOL™ HS series solvents such as HS 101, HS 102, HS 103, HS 104, HS 115. Therefore the carbon dioxide passes through second amine scrubber zone 58 and into line 66. The amine may be regenerated which releases the hydrogen sulfide into line 60. Regenerated amine is then reused, and the hydrogen sulfide may be recycled to the deoxygenation reaction zone. Conditions for the first scrubber zone includes a temperature in the range of 30 to 60° C. The first absorber is operated at essentially the same pressure as the reaction zone. By "essentially" it is meant that the operating pressure of the first absorber is within about 1034 kPa absolute (150 psia) of the operating pressure of the reaction zone. For example, the pressure of the first absorber is no more than 1034 kPa absolute (150 psia) less than that of the reaction zone. The second amine absorber zone is operated in a pressure range of from 138 kPa absolute (20 psia) to 241 kPa absolute (35 psia). Also, at least the first the absorber is operated at a temperature that is at least 1° C. higher than that of the separator. Keeping the absorbers warmer than the separator operates to maintain any light hydrocarbons in the vapor phase and prevents the light hydrocarbons from condensing into the absorber solvent.

The invention claimed is:

1. A process for producing a branched-paraffin-rich diesel or aviation boiling point range hydrocarbon product from a renewable feedstock comprising:
   a) treating the feedstock in a first reaction zone having a process flow by hydrogenating and deoxygenating the feedstock using a catalyst at reaction conditions in the presence of hydrogen to provide a first reaction zone product stream comprising hydrogen, carbon dioxide, and a hydrocarbon fraction comprising n-paraffins in the diesel or aviation boiling point range; and
   b) selectively separating, in a hot high pressure hydrogen stripper, a gaseous stream comprising at least a portion of the hydrogen, water, and carbon oxides from the first reaction zone product stream leaving a remainder stream comprising at least the n-paraffins;
   c) injecting at least a portion of the remainder stream into the first reaction zone as a liquid quench stream wherein the liquid quench stream is injected counter current to the flow in the first reaction zone; and
   d) introducing at least a portion of the remainder stream to a second reaction zone to contact an isomerization catalyst at isomerization conditions to isomerize at least a portion of the n-paraffins and generate a branched paraffin-rich stream.

2. The process of claim 1 further comprising:
e) combining the branched paraffin-rich stream and the gaseous stream to form a combined stream;
f) cooling the combined stream and separating a gaseous component comprising at least hydrogen and carbon dioxide from a liquid hydrocarbon component and a water component; and
g) recovering the liquid hydrocarbon component.

3. The process of claim 1 further comprising removing at least a portion of the hydrogen from the branched paraffin-rich stream and recycling the hydrogen removed from the branched paraffin-rich stream to the hot high pressure hydrogen stripper.

4. The process of claim 1 further comprising recycling the gaseous component comprising at least hydrogen, water, and carbon oxides to the first reaction zone.

5. The process of claim 1 further comprising recycling a portion of the remainder stream comprising a least the n-paraffins to the first reaction zone at a volume ratio of recycle to feedstock in the range of about 2:1 to about 8:1.

6. The process of claim 5 wherein the reaction conditions in the first reaction zone include a temperature of about 40° C. to about 400° C. and a pressure of about 689 kPa absolute (100 psia) to about 13,790 kPa absolute (2000 psia).

7. The process of claim 2 further comprising separating the liquid hydrocarbon component into an LPG and naphtha stream and a diesel or aviation boiling range stream and separating the LPG and naphtha stream into an LPG stream and a naphtha stream.

8. The process of claim 7 further comprising recycling at least a portion of the naphtha steam to the second reaction zone.

9. The process of claim 1 further comprising recycling at least a portion of the branched paraffin-rich stream to the second reaction zone.

10. The process of claim 1 wherein the first and second reaction zones are operated at conditions including a temperature of about 40° C. to about 400° C. and a pressure of about 689 kPa absolute (100 psia) to about 13,790 kPa absolute (2000 psia).

11. The process of claim 1 wherein the hot high pressure hydrogen stripper is operated at a temperature of about 40° C. to about 300° C. and a pressure of about 689 kPa absolute (100 psia) to about 13,790 kPa absolute (2000 psia).

12. The process of claim 1 wherein the hot high pressure hydrogen stripper is operated at a pressure that is within 1034 kPa absolute (150 psia) that of the first reaction zone and wherein the second reaction zone is operated at a pressure at least 345 kPa absolute (50 psia) greater than that of the first reaction zone.

13. The process of claim 1 wherein the renewable feedstock is selected from the group consisting of canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, jatropha oil, tallow, yellow and brown greases, lard, train oil, fats in milk, fish oil, algal oil, sewage sludge, ratanjoy oil, wild castor oil, jangli oil erandi oil, mohuwa oil, karanji honge oil, neem oil, and mixtures thereof.

* * * * *